(No Model.)

C. F. VEIT.
COMBINED ORNAMENTAL CHAIN LINK AND CIGAR CUTTER.

No. 324,281. Patented Aug. 11, 1885.

WITNESSES
Otto Hufeland
William Miller

INVENTOR
Charles F. Veit
by Van Santvoord & Stauff
Attorneys

UNITED STATES PATENT OFFICE.

CHARLES F. VEIT, OF LONDON, ENGLAND.

COMBINED ORNAMENTAL CHAIN-LINK AND CIGAR-CUTTER.

SPECIFICATION forming part of Letters Patent No. 324,281, dated August 11, 1885.

Application filed February 28, 1885. (No model.)

*To all whom it may concern:*

Be it known that I, CHARLES F. VEIT, a citizen of the United States, residing at London, England, have invented a new and useful Improvement in Combined Ornamental Chain-Link and Cigar-Cutter, of which the following is a specification.

This invention consists in a chain-link composed of a tubular casing, a suspension-loop secured to one end of the casing, a spring-supported loop fitted in the other end of said casing, a knife secured to or formed on this spring-supported loop, and a sharp-edged hole in the casing, so that by inserting the tip of a cigar into this hole and pressing the spring-supported loop in, the cigar is cut.

Figure 1:
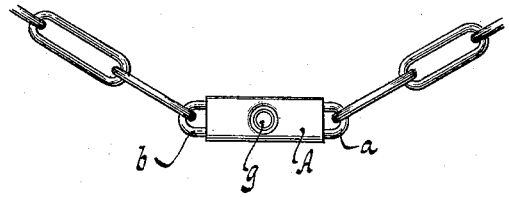
Figure 2:
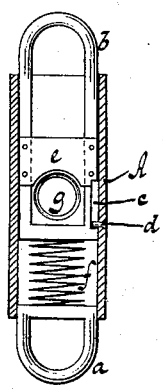
Figure 3:
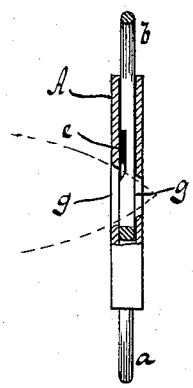

In the accompanying drawings, Figure 1 represents a face view of my chain-link. Fig. 2 is a longitudinal section of the same on a larger scale than the previous figure. Fig. 3 is an edge elevation, partly in section.

Similar letters indicate corresponding parts.

In the drawings, the letter A represents a tubular casing, which is made of sheet metal or any other material suitable for the purpose, and which is open at both ends. In one end of this casing is firmly secured a suspension-loop, $a$, and into its opposite end is fitted the spring-supported cutter-loop $b$. In one edge of this cutter-loop is formed a recess, $c$, and a pin, $d$, extends from the inner surface of the casing into this recess, so as to form a stop, which prevents the cutter-loop from dropping out of the casing. On the loop $b$ is firmly secured a cutter or knife, $e$, and between the inner edges of the two loops $a$ and $b$ is placed a spring, $f$, which has a tendency to force the loop $b$ outward as far as the stop $d$ will permit.

In the sides of the casing A are holes $g$, the inner edges of which are made sharp, and if the tip of a cigar is placed through these holes (see Fig. 3) and the loop $b$ is forced in against the action of the spring $f$, the cigar is cut ready for smoking. If it is desired to cut only a very short end from the cigar, a single hole, $g$, in one side of the casing is sufficient.

What I claim as new, and desire to secure by Letters Patent, is—

A chain-link composed of a tubular casing provided with one or more holes, a suspension-loop secured to one end of the casing, a spring-supported loop fitted in the other end of said casing, and a knife secured to or formed on the spring-supported loop, substantially as shown and described.

In testimony whereof I have hereunto set my hand and seal in the presence of two subscribing witnesses.

CHARLES F. VEIT. [L. S.]

Witnesses:
W. HAUFF,
A. FABER DU FAUR, Jr.